United States Patent
Lection et al.

(10) Patent No.: US 9,959,106 B2
(45) Date of Patent: *May 1, 2018

(54) SHARING OF PORTABLE INITIALIZED OBJECTS BETWEEN COMPUTING PLATFORMS

(71) Applicant: International Business Machines Corporation, Armonk, NY (US)

(72) Inventors: David B. Lection, Raleigh, NC (US); Ruthie D. Lyle, Durham, NC (US); Eric L. Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 581 days.

This patent is subject to a terminal disclaimer.

(21) Appl. No.: 14/080,518

(22) Filed: Nov. 14, 2013

(65) Prior Publication Data

US 2015/0134774 A1    May 14, 2015

(51) Int. Cl.
| | |
|---|---|
| *H04L 29/08* | (2006.01) |
| *G06F 9/455* | (2006.01) |
| *G06F 9/445* | (2018.01) |
| *H04W 4/00* | (2018.01) |

(52) U.S. Cl.
CPC ............ *G06F 8/65* (2013.01); *G06F 9/45558* (2013.01); *H04L 67/10* (2013.01); *H04L 67/34* (2013.01); *H04W 4/008* (2013.01); *G06F 2009/4557* (2013.01); *G06F 2009/45595* (2013.01)

(58) Field of Classification Search
CPC .................. G06F 8/65; G06F 9/45558; G06F 2009/45595; G06F 2009/4557
See application file for complete search history.

(56) References Cited

U.S. PATENT DOCUMENTS

| | | | |
|---|---|---|---|
| 6,052,779 A * | 4/2000 | Jackson | G06F 9/4416 713/2 |
| 6,330,709 B1 | 12/2001 | Johnson et al. | |
| 6,832,369 B1 * | 12/2004 | Kryka | G06F 9/445 717/140 |
| 7,054,924 B1 | 5/2006 | Harvey et al. | |
| 7,139,821 B1 * | 11/2006 | Shah | G06F 8/61 709/203 |
| 7,162,538 B1 * | 1/2007 | Cordova | G06F 8/61 709/238 |
| 7,395,324 B1 * | 7/2008 | Murphy | G06F 17/30067 707/E17.01 |

(Continued)

FOREIGN PATENT DOCUMENTS

WO    WO 2013033612 A1 *    3/2013    ............. G06F 21/33

OTHER PUBLICATIONS

G. Gehlen, and L.. Pham, "Mobile Web Services for Peer-to-Peer Applications", 2nd IEEE Consumer Communications and Networking Conference (CCNC 2005), pp. 427-433.*

(Continued)

*Primary Examiner* — David Lazaro
*Assistant Examiner* — Robert Shaw
(74) *Attorney, Agent, or Firm* — Laura E. Gisler

(57) ABSTRACT

A sub-process is performed on a first computing platform to create a portable initialized object. The portable initialized object is communicated to a second computing platform. The second computing platform uses the portable initialized object to replace performing the sub-process.

3 Claims, 10 Drawing Sheets

(56) References Cited

U.S. PATENT DOCUMENTS

| | | | |
|---|---|---|---|
| 7,418,710 B1* | 8/2008 | Kaspersky | G06F 9/465 |
| | | | 719/313 |
| 7,426,721 B1* | 9/2008 | Saulpaugh | H04L 67/16 |
| | | | 717/143 |
| 7,526,559 B1* | 4/2009 | Phillips | H04L 67/14 |
| | | | 709/203 |
| 7,665,077 B2 | 2/2010 | Mariani et al. | |
| 8,095,630 B1* | 1/2012 | Schettino | G06F 9/4416 |
| | | | 370/231 |
| 8,204,502 B2 | 6/2012 | Khetawat et al. | |
| 8,316,364 B2 | 11/2012 | Stein | |
| 8,555,273 B1* | 10/2013 | Chia | G06F 8/665 |
| | | | 717/168 |
| 8,560,825 B2 | 10/2013 | Butler et al. | |
| 9,135,039 B2 | 9/2015 | Prashanth | |
| 9,270,530 B1* | 2/2016 | Ford | H04L 41/0893 |
| 2002/0029256 A1* | 3/2002 | Zintel | H04L 12/2803 |
| | | | 709/218 |
| 2002/0075844 A1 | 6/2002 | Hagen | |
| 2002/0078255 A1* | 6/2002 | Narayan | G06F 9/548 |
| | | | 719/316 |
| 2002/0094777 A1* | 7/2002 | Cannon | H04L 63/107 |
| | | | 455/41.2 |
| 2002/0098840 A1* | 7/2002 | Hanson | H04L 67/40 |
| | | | 455/435.3 |
| 2002/0184304 A1 | 12/2002 | Meade et al. | |
| 2003/0046370 A1* | 3/2003 | Courtney | H04L 41/0266 |
| | | | 709/220 |
| 2003/0084056 A1* | 5/2003 | DeAnna | G06F 9/465 |
| 2003/0135842 A1* | 7/2003 | Frey | G06F 8/71 |
| | | | 717/121 |
| 2003/0163506 A1* | 8/2003 | Dmitriev | G06F 9/44557 |
| | | | 718/1 |
| 2003/0208595 A1* | 11/2003 | Gouge | H04L 67/16 |
| | | | 709/225 |
| 2003/0220986 A1 | 11/2003 | Thakor | |
| 2004/0003388 A1 | 1/2004 | Jacquemot et al. | |
| 2004/0163008 A1* | 8/2004 | Kim | H04L 69/40 |
| | | | 714/4.1 |
| 2004/0185839 A1* | 9/2004 | Seligmann | H04M 1/006 |
| | | | 455/417 |
| 2005/0074018 A1* | 4/2005 | Zintel | H04L 12/2803 |
| | | | 370/401 |
| 2005/0086328 A1* | 4/2005 | Landram | H04L 67/34 |
| | | | 709/220 |
| 2005/0114871 A1* | 5/2005 | Wolff | G06F 9/445 |
| | | | 719/331 |
| 2005/0149729 A1* | 7/2005 | Zimmer | G06F 21/575 |
| | | | 713/168 |
| 2005/0180326 A1* | 8/2005 | Goldflam | H04L 12/12 |
| | | | 370/231 |
| 2005/0197118 A1 | 9/2005 | Mitchell | |
| 2006/0026305 A1* | 2/2006 | Illowsky | G06F 1/3203 |
| | | | 710/8 |
| 2006/0047829 A1 | 3/2006 | Acharya et al. | |
| 2006/0160622 A1* | 7/2006 | Lee | G07F 17/323 |
| | | | 463/42 |
| 2006/0174238 A1* | 8/2006 | Henseler | G06F 8/63 |
| | | | 717/168 |
| 2006/0225059 A1* | 10/2006 | Plaxton | G06F 9/445 |
| | | | 717/148 |
| 2006/0230395 A1* | 10/2006 | Paul | G06F 8/65 |
| | | | 717/173 |
| 2007/0111799 A1* | 5/2007 | Robb | G07F 17/32 |
| | | | 463/42 |
| 2007/0240160 A1* | 10/2007 | Paterson-Jones | G06F 9/5055 |
| | | | 718/104 |
| 2008/0076420 A1* | 3/2008 | Khetawat | H04W 8/04 |
| | | | 455/435.1 |
| 2008/0141015 A1* | 6/2008 | Chalemin | G06F 9/4416 |
| | | | 713/2 |
| 2008/0155223 A1* | 6/2008 | Hiltgen | G06F 9/45558 |
| | | | 711/173 |
| 2008/0201414 A1* | 8/2008 | Amir Husain | G06F 9/445 |
| | | | 709/203 |
| 2008/0209414 A1* | 8/2008 | Stein | G06F 8/65 |
| | | | 717/173 |
| 2008/0215613 A1* | 9/2008 | Grasso | G06F 9/465 |
| 2008/0259844 A1* | 10/2008 | Richeson | H04M 11/002 |
| | | | 370/328 |
| 2009/0172662 A1* | 7/2009 | Liu | G06F 9/44505 |
| | | | 718/1 |
| 2009/0252325 A1* | 10/2009 | Reus | H04L 9/0891 |
| | | | 380/255 |
| 2010/0142447 A1* | 6/2010 | Schlicht | H04W 4/20 |
| | | | 370/328 |
| 2010/0162229 A1* | 6/2010 | Tsuk | G06F 9/44526 |
| | | | 717/175 |
| 2010/0172293 A1* | 7/2010 | Toth | H04L 29/12028 |
| | | | 370/328 |
| 2010/0258630 A1* | 10/2010 | Shenfield | G06Q 30/00 |
| | | | 235/462.15 |
| 2011/0173678 A1 | 7/2011 | Kaippallimalil et al. | |
| 2011/0298596 A1 | 12/2011 | Warrick | |
| 2011/0302638 A1* | 12/2011 | Cha | G06F 21/57 |
| | | | 726/6 |
| 2011/0314107 A1* | 12/2011 | Garcia | H04L 67/02 |
| | | | 709/206 |
| 2012/0005467 A1 | 1/2012 | Butler et al. | |
| 2012/0108208 A1 | 5/2012 | Willis | |
| 2012/0144391 A1* | 6/2012 | Ueda | G06F 9/45558 |
| | | | 718/1 |
| 2012/0167122 A1* | 6/2012 | Koskimies | G06F 9/5027 |
| | | | 719/328 |
| 2012/0197973 A1* | 8/2012 | Tukol | G06F 9/4451 |
| | | | 709/203 |
| 2012/0216194 A1 | 8/2012 | Hadas et al. | |
| 2013/0124807 A1* | 5/2013 | Nielsen | G06F 11/1438 |
| | | | 711/162 |
| 2013/0139134 A1 | 5/2013 | Burka et al. | |
| 2013/0167140 A1* | 6/2013 | Androncik | G06F 8/61 |
| | | | 717/175 |
| 2013/0218933 A1 | 8/2013 | Ismailov et al. | |
| 2013/0244579 A1* | 9/2013 | Hohteri | H04W 76/023 |
| | | | 455/41.2 |
| 2014/0122395 A1 | 5/2014 | Nahum et al. | |
| 2014/0189808 A1 | 7/2014 | Mahaffey et al. | |
| 2014/0244989 A1* | 8/2014 | Hiltgen | G06F 9/4416 |
| | | | 713/2 |
| 2014/0282895 A1 | 9/2014 | Stuntebeck | |
| 2014/0337405 A1* | 11/2014 | Athas | H04L 67/26 |
| | | | 709/203 |

OTHER PUBLICATIONS

D. Russo, Distributed Computing: Objects and Components in the Enterprise, CRC Press LLC, 1999.*

G. Gehlen, and L. Pham, "Mobile Web Services for Peer-to-Peer Applications", 2nd IEEE Consumer Communications and Networking Conference (CCNC 2005), pp. 427-433.*

Verbeke et al, Framework for Peer-to-Peer Distributed Computing in a Heterogeneous, Decentralized Environment, GRID 2002, LNCS 2536, Springer-Verlag, 2002 pp. 1-12.*

D. Russo, Data Communications Management—Distributed Computing: Objects and Components in the Enterprise, CRC Press 1999.*

G. Gehlen and L. Pham, Mobile Web Services for Peer-to-Peer Applications, IEEE 2004.*

Krsul et al., "VMPlants: Providing and Managing Virtual Machine Execution Environments for Grid Computing", Nov. 6, 2004, SC2004, Copyright 2004 IEEE, 12 pages.

Karger, David et al, "New Algorithms for Load Balancing in Peer-to-Peer Systems," MIT Laboratory for Computer Science, Cambridge, Massachusetts, Technical Report LCS-TR-911, MIT, Jul. 2003.

(56) References Cited

OTHER PUBLICATIONS

Stoica, Ion et al, "Chord: A Scalable Peer-to-Peer Lookup Service for Internet Applications," MIT Laboratory for Computer Science, Tech. Rep. TR-819, MIT LCS, Mar. 2001, http://www.pdos.lcs.mit.edu/chord/papers/.
"Accelerated Examination Support Document", International Business Machines Corporation, dated Dec. 2, 2015, 7 pages.
Lection et al., "Sharing of Portable Initialized Objects Between Computing Platforms", U.S. Appl. No. 14/977,913, filed Dec. 22, 2015.

\* cited by examiner

SHARING OF PORTABLE INITIALIZED OBJECTS BETWEEN COMPUTING PLATFORMS

BACKGROUND

The present disclosure relates generally to the field of data transfer between computing platforms and more particularly to transfer of initialized objects between computing platforms.

The use of virtual machine technology (VM) in cloud computing and other environments is on the rise. VM technology is useful for custom packaging and execution of operating systems. As the user's needs within a VM change, the package can be configured to meet the user's needs. One aspect of expense in the processing of VM's is the ongoing time cost of invoking a VM, which typically includes the initialization steps required to boot-up the underlying operating system, as well as the application of new and ongoing maintenance applied to VM as it is running.

SUMMARY

Disclosed herein are embodiments of a method for bypassing a sub-process on a first computing platform. The method includes receiving, from a second computing platform, a portable initialized object. The portable initialized object was generated by execution of the sub-process on the second computing platform. The method further includes using the portable initialized object to replace performing the sub-process.

Also disclosed herein are embodiments of a method for sharing a portable initialized object by a first computing platform. The method includes executing a sub-process to generate the portable initialized object and communicating the portable initialized object to a second computing platform. The portable initialized object is configured to replace performance of the sub-process in the second computing platform.

DETAILED DESCRIPTION

Figure 1:
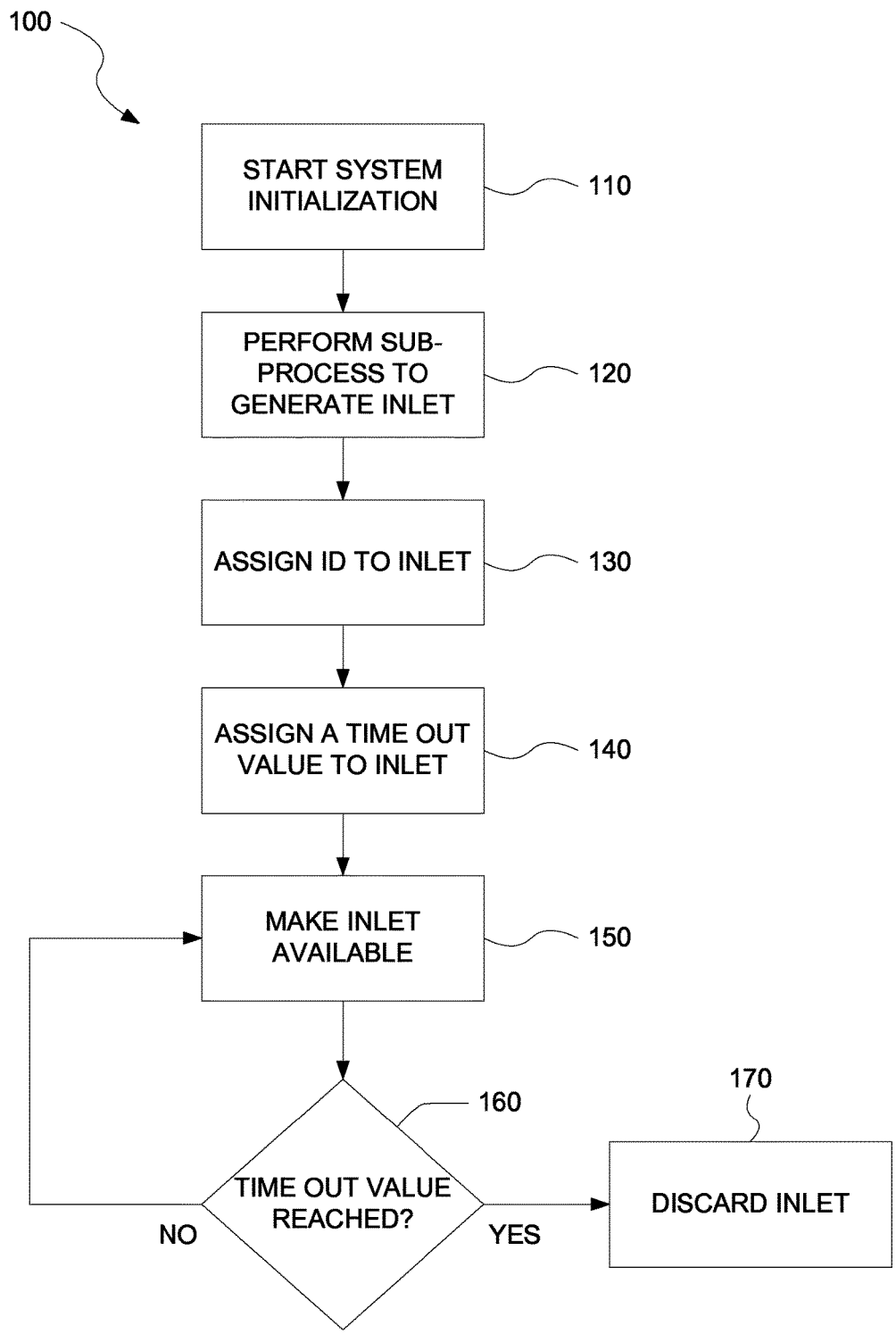
FIG. 1 depicts a flow diagram of an example method for sharing an inlet by a computing platform.

In this detailed description, reference is made to the accompanying drawings, which illustrate example embodiments. It is to be understood that other embodiments may be utilized and structural changes may be made without departing from the scope of the disclosure. The terminology used herein is for the purpose of describing particular embodiments only and is not intended to be limiting. In accordance with disclosed features, a method, system, and computer program product are provided for sharing portable initialized objects between computing platforms.

Embodiments of the current invention provide methods which may lower the time spent processing certain sequences in the boot-up process of a computing platform, and may also lower the time spent performing ongoing maintenance of computing platforms that are executing in close network peer-to-peer proximity to each other. For the purposes of this application the term "inlet" will refer to portable initialized objects created by a sub-process during the boot-up process and the term "outlet" will refer to portable initialized objects created by a sub-process during application of updates.

When an operating system on a computing platform begins the boot-up process, the sequence of events comprises initialization of a series of data structures, devices, and the like. Once the operating system is initialized, a user interface is displayed, typically a logon challenge, and the operating system is ready for a user to log in and begin using the system. During this boot up process multiple initialization sub-processes can be identified based on the time required to perform the sub-processes. Inlets created during these sub-processes may be made available to another computing platform which is in the boot-up process. The other computing platform may use the inlets to avoid performing the sub-processes, which may result in a faster boot up.

For example, when initializing the TCP/IP configuration, there is a time consuming process of reading and XML parsing the TCP/IP configuration into a Document Object Model (DOM). This sub-process may be isolated into an inlet for a VM configuration. Once the initialization of the DOM is complete, it may be shared with other VM's. As part of the inlet transfer process, the DOM may be placed in a memory block, and the offer to use the DOM posted by the VM. Then other VM's in close peer network proximity can transfer the DOM already pre-parsed to their VM and begin using the DOM. The second VM saves the time of loading and parsing the XML document. Close peer network proximity includes mechanisms like Bluetooth, Near Field Communication (NFC), peer-to-peer 802.11 wifi, wifi direct, or other means where the two VM's can communicate directly. The use of close peer network connections may limit the usage and bandwidth of the larger non-peer connected networks.

In another embodiment, a computing platform in a "booting-up" state may be broadcasting inlets at a particular location where many computing platforms are booting up. For example, a computing platform producing and sharing inlets could be used at an airport terminal where many computers are booting-up on a recently landed plane. These inlets may also contain an advertisement which is displayed on the computing system which receives the inlet.

A similar method may be applied to updates for computing platforms. A computing platform may download and unpack an update to create an outlet. However, the computing platform may process and apply the outlet at the time of creation (or transfer), or it may be processed and applied at a later time such as when the computing platform is being terminated.

For example, a VM may receive a critical update notice. The VM may download and unpack the critical update to create an outlet. The VM may process and apply the outlet at creation or at a later time. The VM may make the outlet available to other VM's of the same or similar configuration which may also apply the update. Then other VM's in close peer network proximity can transfer the DOM already pre-parsed to their VM and begin using the DOM. The second VM saves the time of downloading the update from a server and unpacking of the update. Close peer network proximity includes mechanisms like Bluetooth, near field communication (NFC), peer-to-peer 802.11 wifi, wifi direct, or other means where the two VM's can communicate directly. The use of close peer network connections may limit the usage and bandwidth of the larger non-peer connected networks.

Identification of inlets and outlets may be provided in several ways. In some embodiments this will be handled with a naming system that names the inlet or outlet and the maintenance level of the inlet or outlet using a composite hash tag. In some embodiments, the identification will include information encoded in the ID value to allow inlets and outlets to be applied in a specific order. The receiving VM will understand the naming system, and queue and hold any number of inlets or outlets until they can be applied to the VM in proper order.

Security for sharing inlets and outlets may be provided in several ways. In some embodiments this will be handled with a naming system that names the inlet or outlet and the maintenance level of the inlet or outlet using a composite hash tag. In some embodiments, the computing systems may require authorization to share which may include using a list of authorized users or computing platforms which may be edited by a system administrator. In some embodiments, a computing platform may be authorized if it is located in an acceptable location. The location may be determined through GPS or any other method. Other security mechanisms may also be employed.

Referring now to FIG. 1, a flow diagram 100 of an example method for sharing an inlet by a computing platform is depicted. At step 110, the computing platform starts system initialization. The computing platform may be any computing platform such as a virtual machine, logical partition, or hardware based non-virtual machine. At step 120, the computing platform performs a sub-process to generate a portable initialized object (inlet). At step 130, the computing platform assigns an ID to the inlet. The ID may indicate which sub-process the inlet is associated with. At step 140, a time out value is assigned to the inlet. The time out value may represent when the computing platform should discard the inlet. At step 150, the inlet is made available to other computing platforms. An offer to use the inlet may be posted by the computing platform. The computing platform may communicate the inlet to a second computing platform which is initializing. This communication may occur through a peer-to-peer network. The peer-to-peer network may be a connection where the two computing platforms communicate directly, such as Bluetooth, Near Field Communication, peer-to-peer 802.11 wifi, or wifi direct.

At step 160, the computing platform determines if the time out value has been reached for the inlet. If the time out value has not been reached, the computing platform may return to step 150 and continue to make the inlet available. If the computing platform detects that the time out value has been reached, the computing platform may continue to step 170 and discard the inlet.

Figure 2:
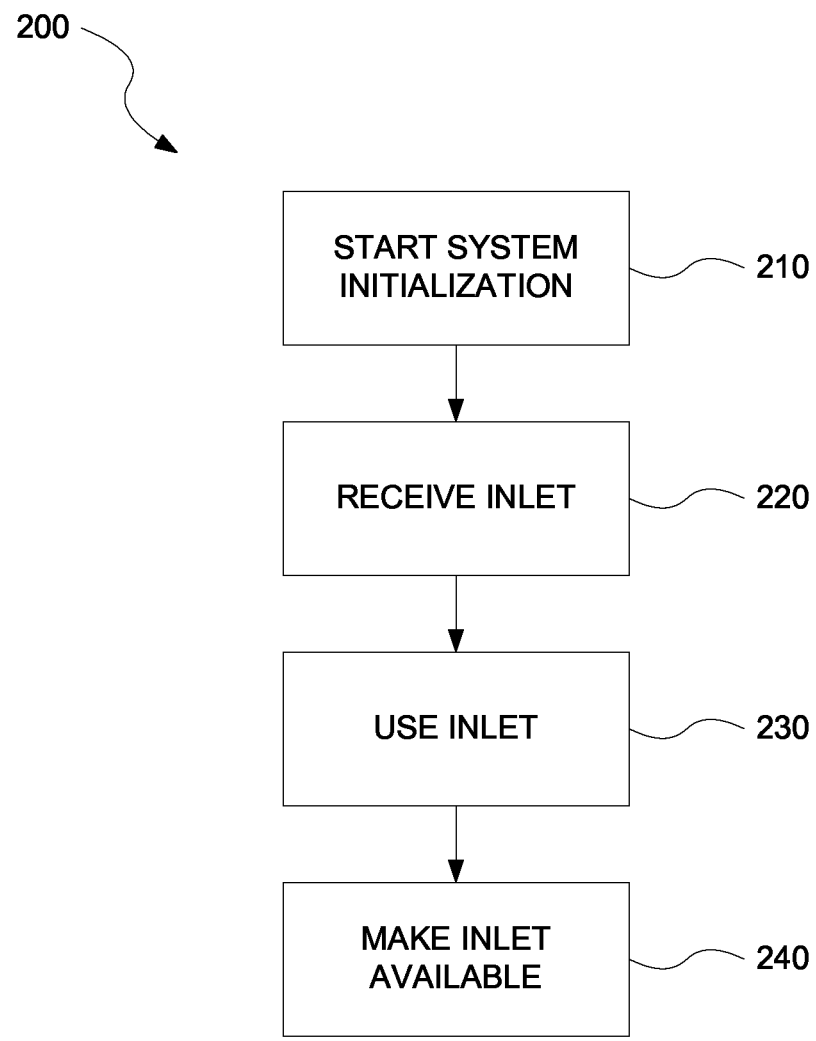
FIG. 2 depicts a flow diagram of an example method for using an inlet to bypass a sub-process on a computing platform.

FIG. 2 depicts a flow diagram 200 of an example method for using an inlet to bypass a sub-process on a computing platform. At step 210, a first computing platform starts system initialization. The first computing platform may be any computing platform such as a virtual machine, logical partition, or hardware based non-virtual machine. At step 220, the first computing platform receives a portable initialized object (inlet) from a second computing platform. The inlet may have been produced by a sub-process performed by the second computing platform. The inlet may be received through a peer-to-peer network. The peer-to-peer network may be a connection where the two computing platforms communicate directly, such as Bluetooth, Near Field Communication, peer-to-peer 802.11 wifi, or wifi direct. At step 230, the inlet is used by the first computing platform to replace performance of the sub-process during initialization. At step 240, the first computing platform makes the inlet available to other computing platforms.

Figure 3:
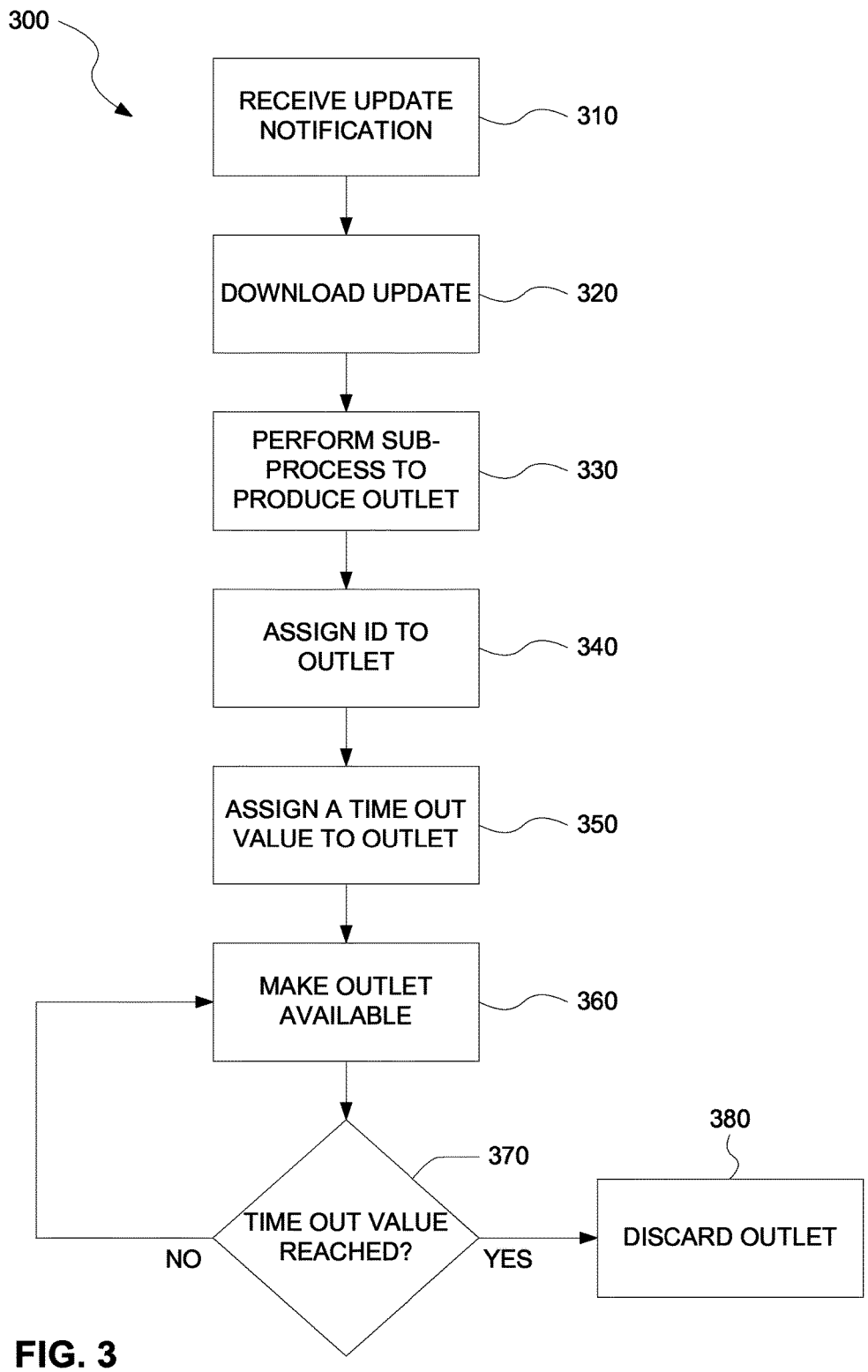
FIG. 3 depicts a flow diagram of an example method for sharing an outlet by a computing platform.

FIG. 3 depicts a flow diagram 300 of an example method for sharing an outlet by a computing platform. At step 310, the computing platform receives an update notification. The computing platform may be any computing platform such as a virtual machine, logical partition, or hardware based non-virtual machine. At step 320, the computing platform downloads the update. At step 330, the computing platform performs a sub-process related to the update to generate a portable initialized object (outlet). At step 340, the computing platform assigns an ID to the outlet. The ID may indicate which sub-process the outlet is associated with or which update the outlet is associated with. At step 350, a time out value is assigned to the outlet. The time out value may represent when the computing platform should discard the outlet. At step 360, the outlet is made available to other computing platforms. An offer to use the outlet may be posted by the computing platform. The computing platform may communicate the outlet to a second computing platform which is initializing. This communication may occur through a peer-to-peer network. The peer-to-peer network may be a connection where the two computing platforms communicate directly, such as Bluetooth, Near Field Communication, peer-to-peer 802.11 wifi, or wifi direct.

At step 370, the computing platform determines if the time out value has been reached for the outlet. If the time out value has not been reached, the computing platform may return to step 360 and continue to make the outlet available. If the computing platform detects that the time out value has been reached, the computing platform may continue to step 380 and discard the outlet.

Figure 4:
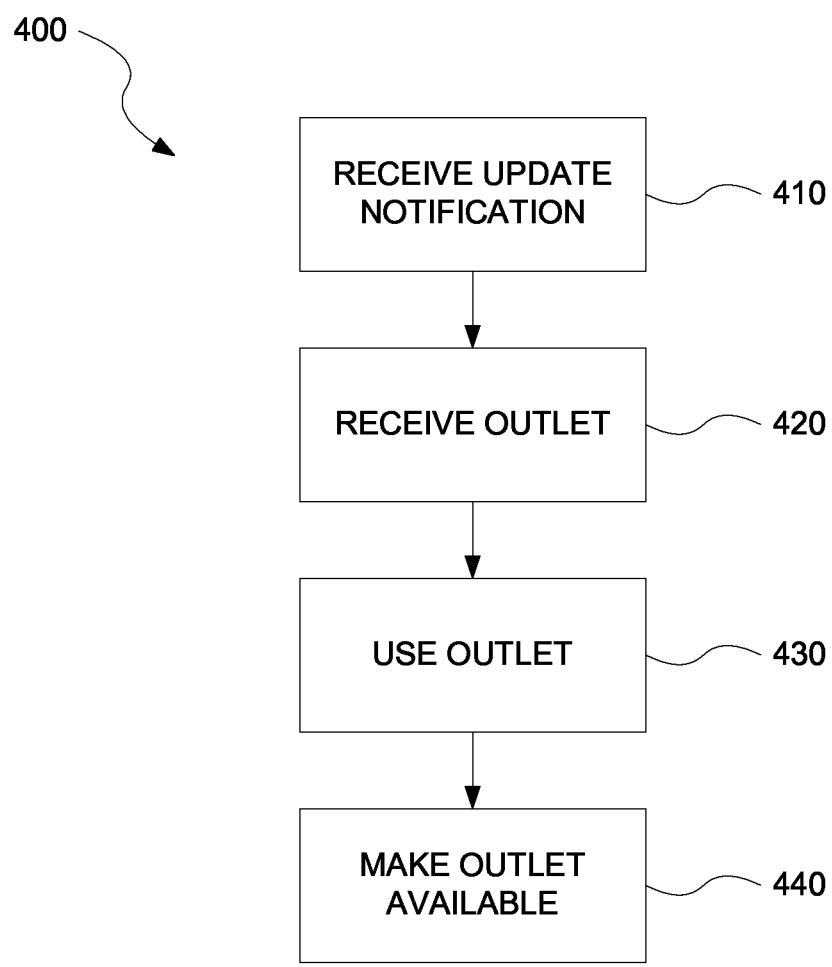
FIG. 4 depicts a flow diagram of an example method for using an outlet to bypass a sub-process on a computing platform.

FIG. 4 depicts a flow diagram 400 of an example method for using an outlet to bypass a sub-process on a computing platform. At step 410, a first computing platform receives an update notification. The first computing platform may be any computing platform such as a virtual machine, logical partition, or hardware based non-virtual machine. At step 420, the first computing platform receives a portable initialized object (outlet) from a second computing platform. The outlet may have been produced by a sub-process performed by the second computing platform. This portable object may be used by the first computing platform in lieu of the first computing platform downloading and initializing the update separately. The outlet may be received through a peer-to-peer network. The peer-to-peer network may be a connection where the two computing platforms communicate directly, such as Bluetooth, Near Field Communication, peer-to-peer 802.11 wifi, or wifi direct. At step 430, the outlet is used by the first computing platform to replace performance of the sub-process in applying the update. At step 440, the first computing platform makes the outlet available to other computing platforms.

Figure 5:
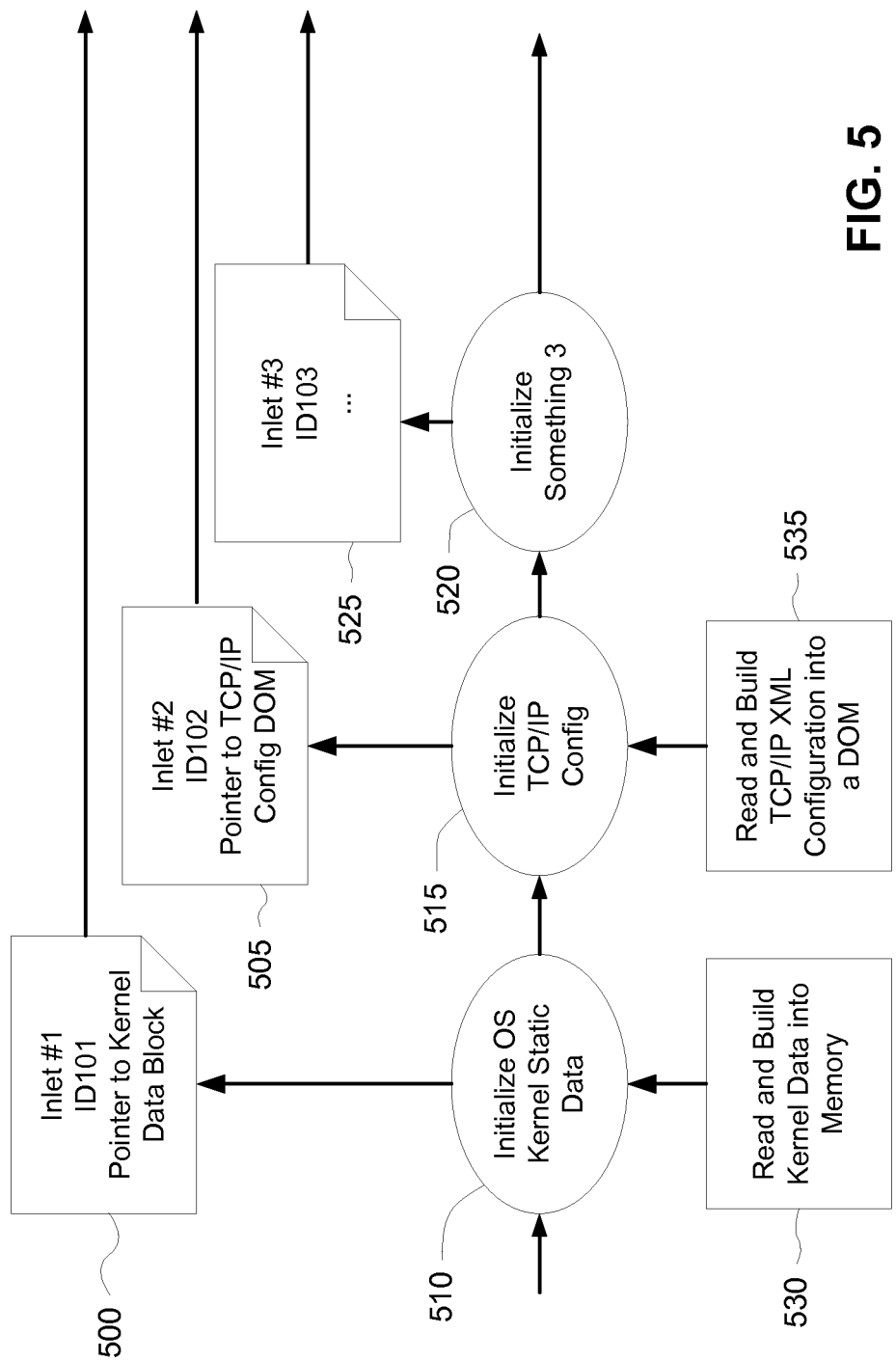
FIG. 5 depicts an example flow diagram of the creation of inlets in a VM during initialization.

FIG. 5 depicts an example flow diagram of the creation of inlets in a VM during initialization. Blocks 510, 515, and 520 represent three processes performed by the VM during initialization. Block 510 represents the process of initializing the operating system kernel static data. Block 530 represents the sub-process of reading and building the kernel data into memory. The sub-process produces an inlet, the kernel data block. Block 500 represents the VM making the kernel data block available to other VM's with an ID of 101. The ID may indicate the other VM's which sub-process the inlet is associated with. The VM may communicate the kernel data block via peer-to-peer network to other VM's in network proximity that are also in the initialization phase.

Block 515 represents the process of initializing TCP/IP Configuration. Block 535 represents the sub-process of reading and building TCP/IP XML Configuration into a document object model (DOM). The sub-process creates an inlet, the TCP/IP Configuration DOM. Block 505 represents the VM making the TCP/IP Configuration DOM available to other VM's with an ID of 102. The ID may indicate the other VM's which sub-process the inlet is associated with, or may indicate that this inlet is used after the inlet with ID 101. The VM may communicate the TCP/IP Configuration DOM via peer-to-peer network to other VM's in network proximity that are also in the initialization phase.

Block 520 represents a third initialization process. The process includes a sub-process which creates an inlet. Block 525 represents the VM making the inlet available with an ID of 103. The ID may indicate the other VM's which sub-process the inlet is associated with, or may indicate that this inlet is used after the inlets with ID's 101 and 102. The VM may communicate the TCP/IP Configuration DOM via peer-to-peer network to other VM's in network proximity that are also in the initialization phase.

Figure 6:
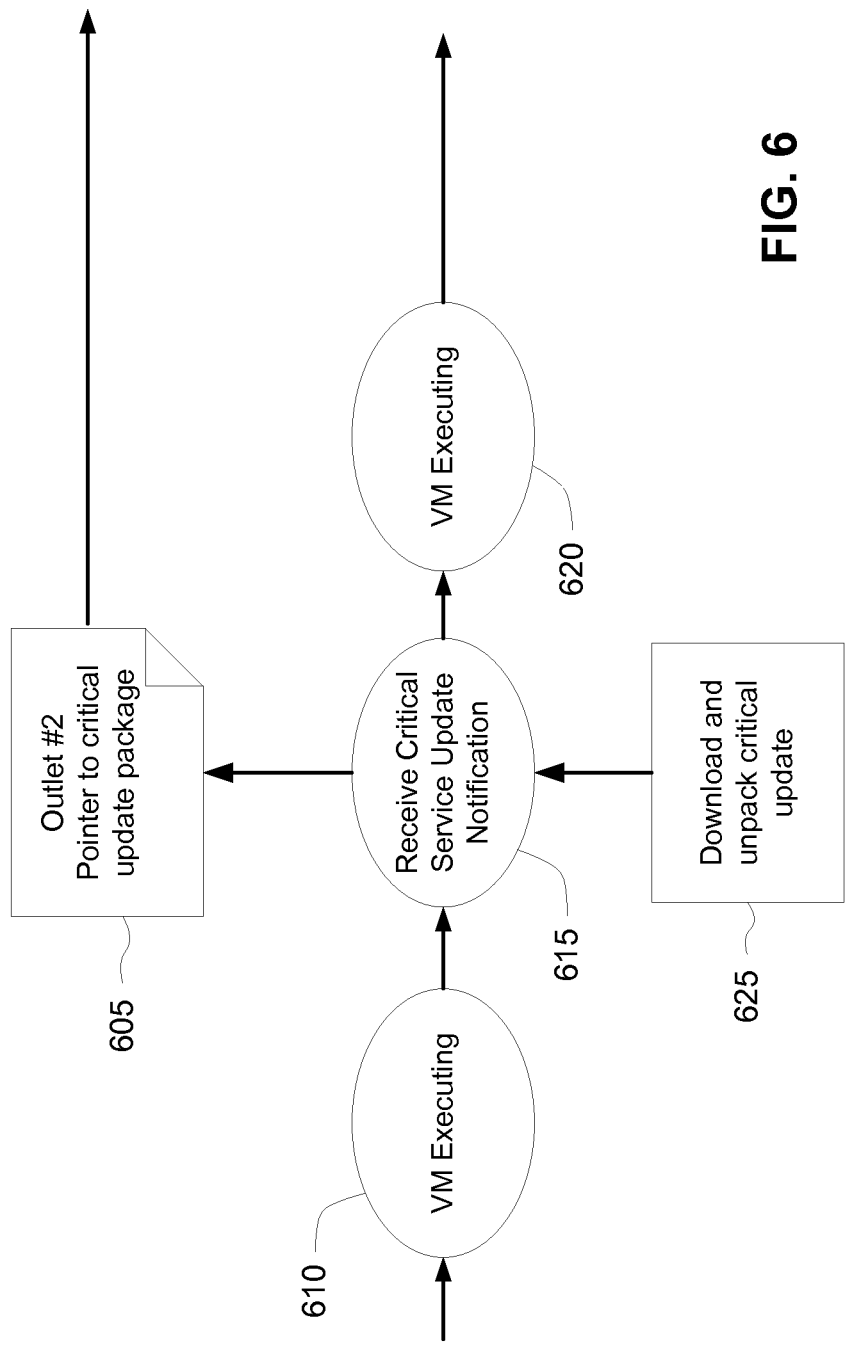
FIG. 6 depicts an example flow diagram of the creation of an outlet by a VM.

FIG. 6 depicts an example flow diagram of the creation of an outlet by a VM. Block 610 represents the VM executing processes. Block 615 represents the VM receiving a critical service update notification and the process of applying the update. Block 625 represents the sub-process of downloading and unpacking the critical update. The sub-process creates an outlet, the unpacked critical update package. Block 605 represents the VM making the unpacked critical update package available to other VM's. The VM may communicate the unpacked critical update package via peer-to-peer network to other VM's in network proximity that are also in the initialization phase. Block 620 represents the VM continuing to execute processes.

Figure 7:
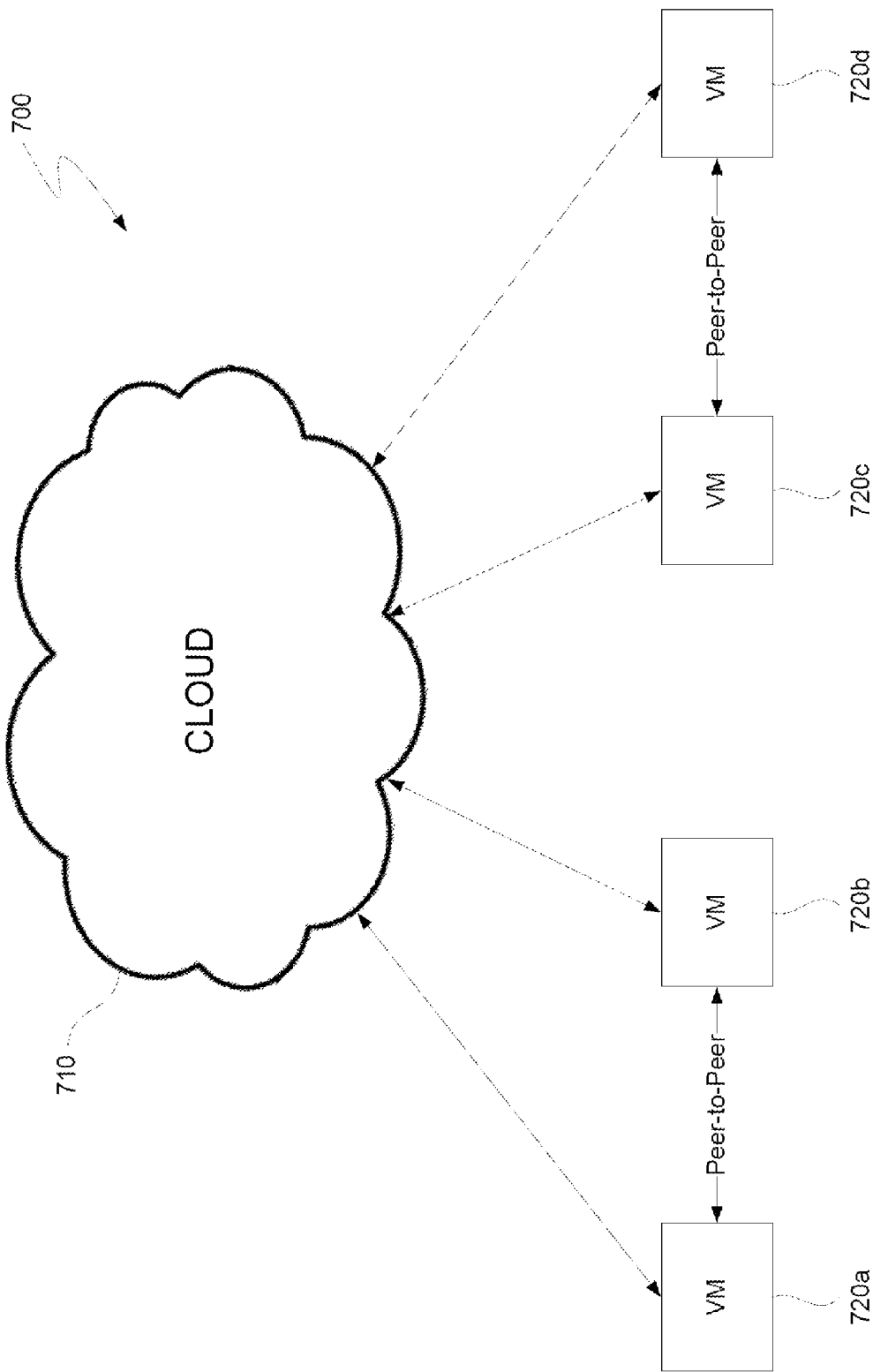
FIG. 7 depicts a high level block diagram of an example system for sharing portable initialized objects between computing systems.

FIG. 7 depicts a high level block diagram of an example system 700 for sharing portable initialized objects between computing systems. Four VM's 720a-d are connected to cloud computing environment 710 for use of at least some of the computing resources of cloud 710. VM 720a is in communication with VM 720b via a peer-to peer network. VM's 720a and 720b may be in close network peer-to-peer proximity to each other using, for example, Bluetooth, Near Field Communication (NFC), peer-to-peer 802.11 wifi, or wifi direct. Inlets and outlets may be transferred between VM's 720a and 720b via the peer-to-peer network. VM's 720c and 720d are similarly in communication with each other via a peer-to-peer network. However, VM's 720 c-d are not in peer-to-peer communication with VM's 720a-b. This may be because they are not in close enough proximity to each other to use close peer-to-peer networks such as Bluetooth, Near Field Communication, peer-to-peer 802.11 wifi, or wifi direct. Although the VM's shown are only in peer-to-peer communication with one other VM, they may be in peer-to-peer communication with any number of VM's.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
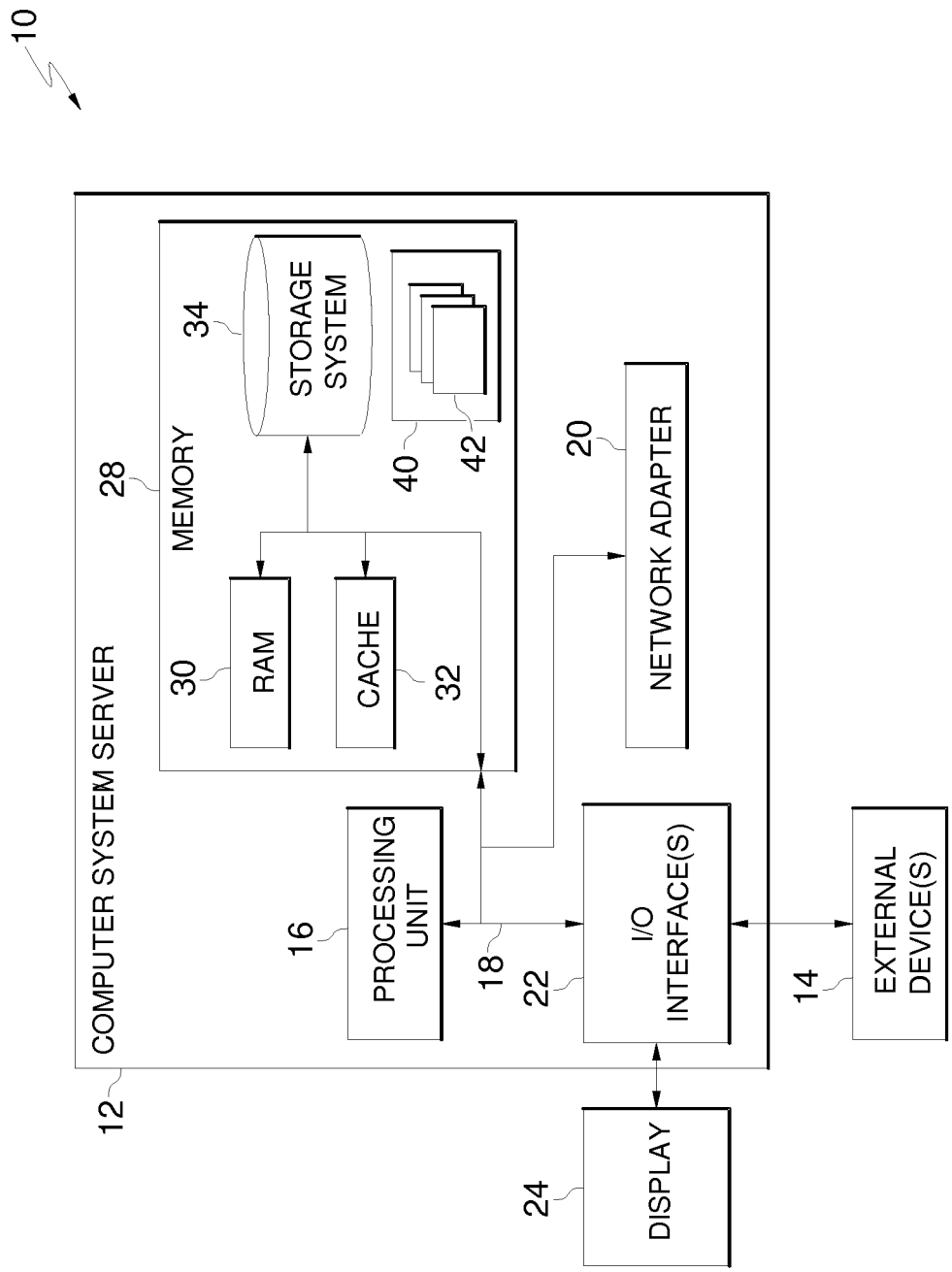
FIG. 8 depicts a schematic of an example of a cloud computing node.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
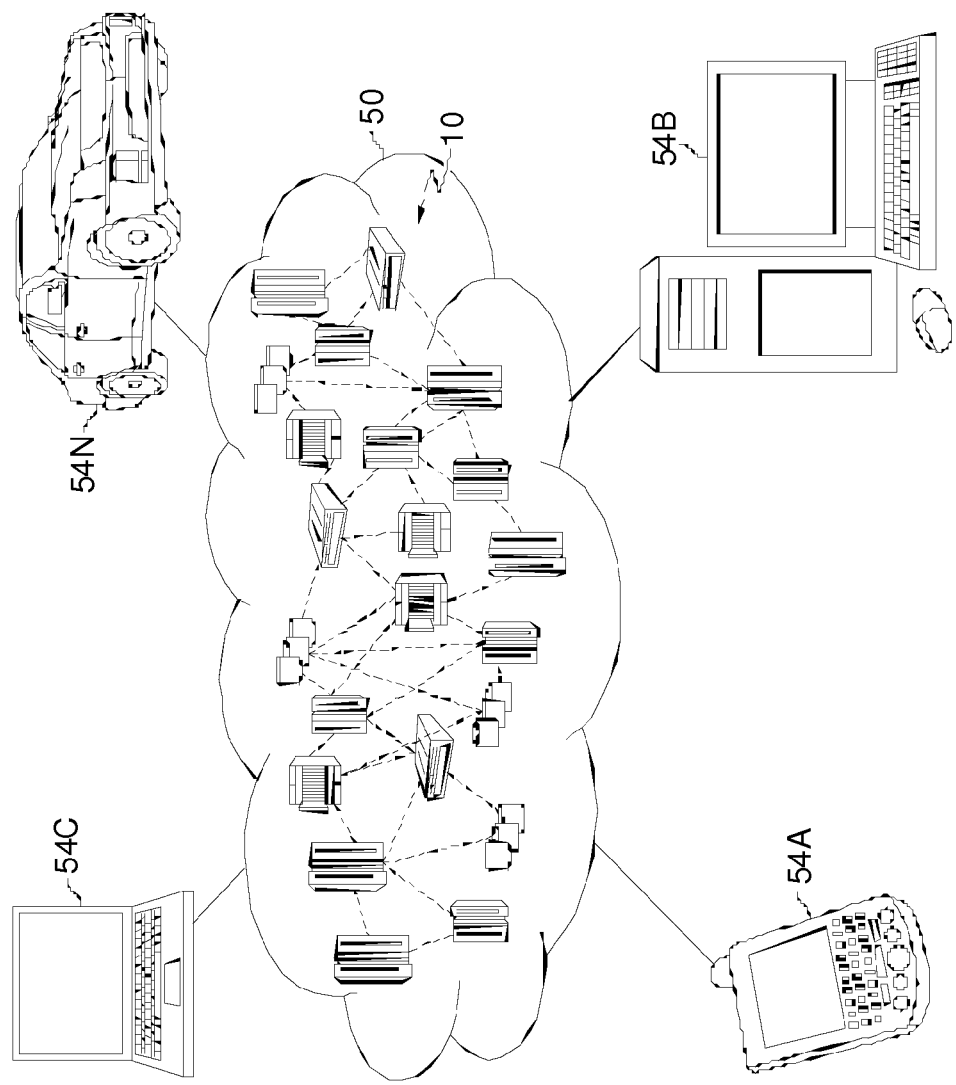
FIG. 9 depicts an illustrative cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
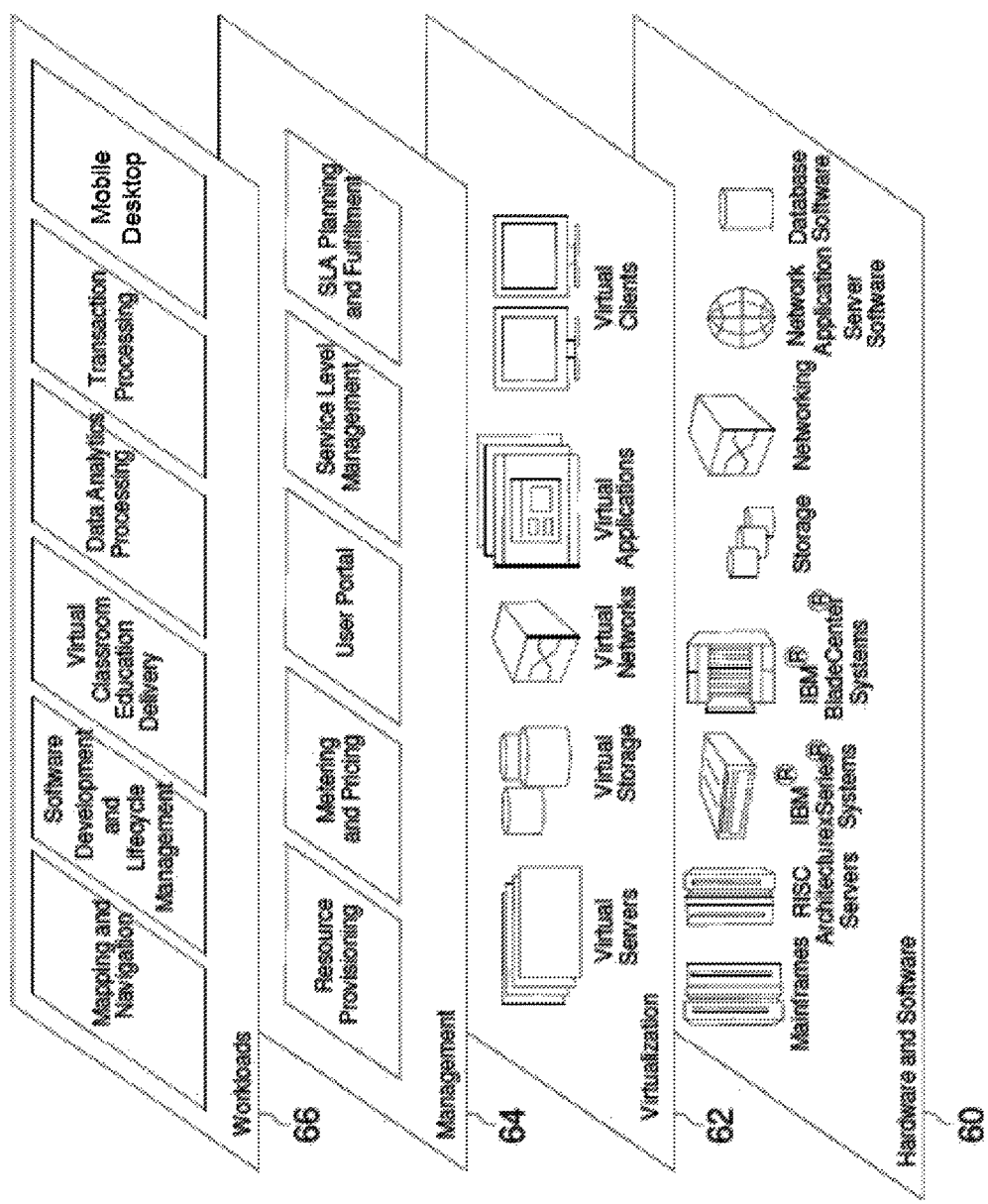
FIG. 10 depicts a set of functional abstraction layers provided by cloud computing environment.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter0 systems; storage devices; networks and networking components. Examples of software components include network application server software, in one example IBM WebSphere® application server software; and database software, in one example IBM DB2 database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Embodiments described herein may be in the form of a system, a method, or a computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments are not intended to limit the present invention. Indeed, other alternative hardware and/or program environments may be used without departing from the scope of embodiments of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for sharing portable initialized objects by a first virtual machine, the method comprising:

generating a Document Object Model (DOM) by reading and parsing a TCP/IP configuration represented in Extensible Markup Language (XML) format during a boot-up process;
placing the DOM object in a memory block of the first virtual machine;
assigning a first ID to the DOM object, the first ID indicating the DOM object is associated with reading and parsing the TCP/IP configuration;
assigning a first time out value to the DOM object, the first time out value indicating when the first virtual machine will discard the DOM object;
determining that a second virtual machine is authorized to receive the DOM object based on a location of the second virtual machine;
establishing a wireless connection between the first virtual machine and the second virtual machine;
determining the first time out value has been reached; discarding the DOM object in response to the determining the first time out value has been reached;
creating an unpacked update package by unpacking an update, the update downloaded in response to a detection of the update;
assigning a second ID to the unpacked update package, the second ID indicating that the unpacked update package is associated with unpacking the update;
assigning a second time out value to the unpacked update package, the second time out value indicating when the first virtual machine will discard the unpacked update package;
communicating the DOM object and the unpacked update package to the second virtual machine, over the wireless connection;
determining the second time out value has been reached; and discarding the unpacked update package in response to the determining the second time out value has been reached.

2. The method of claim 1, further comprising:
determining a third virtual machine is authorized to receive the DOM;
establishing, between the first virtual machine and a third virtual machine, a wireless connection; and
communicating, by the first virtual machine, the DOM to the third virtual machine.

3. The method of claim 1, wherein the location of the second machine is based on a Global Positioning System (GPS) location.

* * * * *